US00RE37697E

(19) United States
(12) Reissued Patent
Nellums et al.

(10) Patent Number: US RE37,697 E
(45) Date of Reissued Patent: May 14, 2002

(54) SELF-ENERGIZING SYNCHRONIZER WITH FORCE LIMITING

(75) Inventors: Richard A. Nellums, Chorley (GB); Eugene R. Braun, deceased, late of Royal Oak, MI (US)

(73) Assignee: Eaton Corporation, Cleveland, OH (US)

(21) Appl. No.: 09/687,169

(22) Filed: Oct. 16, 2000

Related U.S. Patent Documents

Reissue of:
(64) Patent No.: 5,078,245
Issued: Jan. 7, 1992
Appl. No.: 07/632,884
Filed: Dec. 24, 1990

(51) Int. Cl.[7] ..... F16D 23/06
(52) U.S. Cl. ..... 192/53.332
(58) Field of Search ..... 192/53.332, 53.331, 192/53.33, 53.3, 53.1; 74/339

(56) References Cited

U.S. PATENT DOCUMENTS

| | | | | | |
|---|---|---|---|---|---|
| 2,410,511 | A | * | 11/1946 | Letsinger et al. | 192/53 |
| 2,627,955 | A | | 2/1953 | Perkins | |
| 2,896,760 | A | * | 7/1959 | Hebbinghaus | 192/53 |
| 2,978,083 | A | * | 4/1961 | Henyon | 192/114 |
| 3,221,851 | A | * | 12/1965 | Vandervoort | 192/53 |
| 3,548,983 | A | * | 12/1970 | Hiraiwa | 192/53 |
| 3,804,218 | A | * | 4/1974 | Krutashov | 192/53 E |
| 3,910,390 | A | * | 10/1975 | Eichinger | 192/53 E |
| 4,018,319 | A | * | 4/1977 | Thomas | 192/53 E |
| 4,413,715 | A | * | 11/1983 | Michael et al. | 192/53 F |
| 4,836,348 | A | * | 6/1989 | Knodel et al. | 192/53 F |
| 4,869,353 | A | * | 9/1989 | Ohtsuki et al. | 192/53 F |

FOREIGN PATENT DOCUMENTS

DE 1098824 2/1961

* cited by examiner

*Primary Examiner*—Charles A. Marmor
*Assistant Examiner*—Saúl Rodríguez
(74) *Attorney, Agent, or Firm*—Howard D. Gordon

(57) ABSTRACT

A pin-type, double-acting synchronizer mechanism (22) includes friction clutches (24,36 and 26,38), jaw clutches (28,14b,16b), self-energizing ramps, (13f,13g,13h,13i and 29e,29f,29g,29h), and springs (33) to limit the maximum self-energizing or additive force provided by the ramps. The ramps act between a shaft (12) and jaw clutch (28). A shift flange (32) is rotatably fixed to the jaw clutch (28) by splines which allow relative axial movement against the force of the springs (33). The jaw clutch (28) and the shaft (12) include mating splines (29,13) divided into spline portions (29a,29b, 29c,29d and 13a,13b,13c,13d,13e) to define the ramps to control limited relative rotation between the jaw clutch (28) and shaft (12), and to provide surface area and structural strength for transmitting full torque to the shaft and gears.

30 Claims, 3 Drawing Sheets

10
22
2
Fo
26
16a
32b
32d
32e
40
24
α
14a
40c
40d
40b
40a
14b
30
16
14
14c
16c
20
18
30a
30b
16b
13e
13d
13
13
3
13a
13b
13c
3
12a
29b
29c
29a
28
32a
29
29d
12
34
34
33
33
36b
38b
36
32c
38
44
44
44b
36a
15
24a
44a
32f
26a
38a
32f
42
17
2
32

SELF-ENERGIZING SYNCHRONIZER WITH FORCE LIMITING

Matter enclosed in heavy brackets [ ] appears in the original patent but forms no part of this reissue specification; matter printed in italics indicates the additions made by reissue.

CROSS-REFERENCE TO RELATED APPLICATIONS

This application is related to U.S. application Ser. Nos. 07/632,880; 07/632,881; 07/632,882; 07/632,883; 07/633,703; 07/633,704; 07/633,738; 07/633,739; 07/633,743; 07/633,744; Dec. 24, 1990, all assigned to the assignee of this application, and all incorporated herein by reference.

FIELD OF THE INVENTION

This invention relates to synchronizer mechanisms for a transmission. More specifically, the invention relates to such mechanisms of the self-energizing type with means to limit self-energizing force.

BACKGROUND OF THE INVENTION

It is well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for heavy duty trucks. Prior art examples of such mechanisms may be seen by reference to U.S. Pat. Nos. 2,410,511; 2,896,760; 3,548,983; 4,413,715; 4,836,348; and 4,869,353 which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of an additive to the shift force for further increasing the synchronizing torque of the friction members.

The basic purpose of such self-energizing synchronizer mechanisms is of course to provide faster synchronizing times with relatively moderate shift force from a manually operated shift lever for example. For a given synchronizer mechanism geometry and shift force, the additional force may be varied by varying the angles of the self-energizing ramps. In theory, ideal ramp angles exist which produce maximum controllable additional forces. For the frame of ramp angle references herein, the additional forces decreases as the ramp angles increase. Ramp angles less than the ideal angles produce uncontrollable additional forces, which once initiated, rapidly increase independent of the shift force and quickly drive the cone clutch to a lock-up condition. Ramp angles producing uncontrollable additional forces are said to be self-locking rather than self-energizing. Self-locking decreases shift quality or feel, may over stress synchronizer and other components, may cause overheating and rapid wear of the cone clutch surfaces, and may even override operator movement of the shift lever.

In practice the so called ideal ramp angles may vary substantially due to any of several variables, e.g., coefficient of friction variations, ramp surface wear, manufacturing tolerances, etc.

SUMMARY OF THE INVENTION

An object of this invention is to provide a self-energizing synchronizer mechanism which limits the additional forces produced by self-energizing ramps.

According to a feature of the invention, a self-energizing synchronizer mechanism is provided for a first gear secured against axial movement on a shaft having an axis about which the gear and shaft rotate relative to each other. The mechanism comprises: first friction and jaw means drivingly connected to the shaft and respectively engagable with friction and jaw means affixed to the first gear for respectively synchronizing and positive connecting the first gear to the shaft in response to a shift force axially directed toward the first gear moving a shift means toward the first gear; first and second blocker means operative when engaged for preventing engagement of the jaw means prior to the synchronizing; pre-energizer means for engaging the friction means in response to initial axial movement of the shift means by the shift force from a neutral position toward the first gear, for engaging the blocker means in response to engagement of the friction means producing an initial synchronizing torque, and for transmitting the shift force to the first friction means via the blocker means to increase the engaging force of the friction means; and first self-energizing means including first and second ramp means engagable in response to synchronizer torque in one direction for reacting the synchronizing torque between the friction means and the shaft and for producing an axial additional force which further increases the force engaging the first friction means.

The improvement is characterized by resilient means for limiting the additional force.

BRIEF DESCRIPTION OF THE DRAWINGS

The synchronizer mechanism of the invention is shown in the accompanying drawings in which.

DETAILED DESCRIPTION OF THE DRAWINGS

Figure 1:
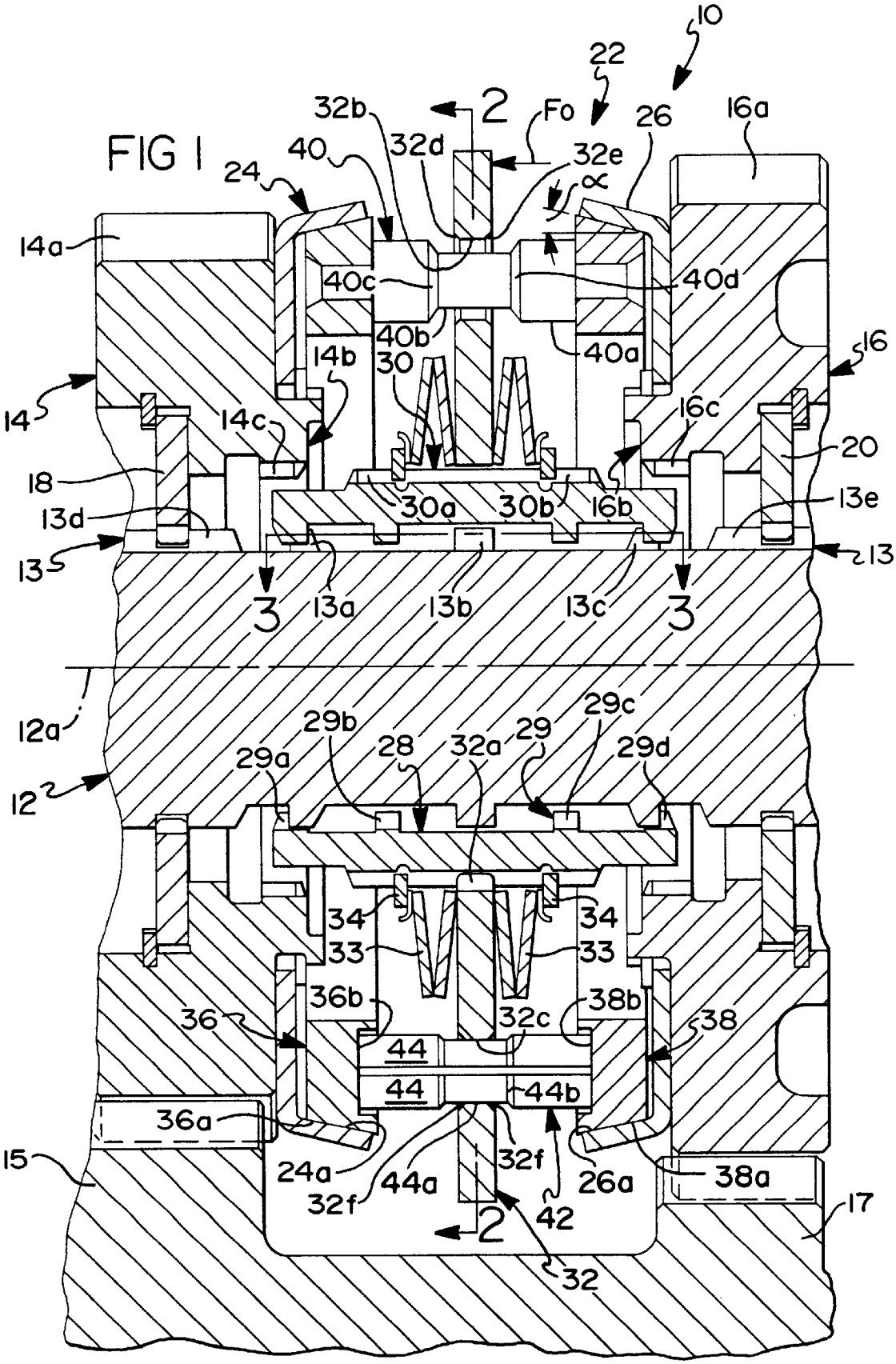
FIG. 1 is a sectional view of a double-acting synchronizer mechanism looking along line 1—1 of FIG. 2.
Figure 2:
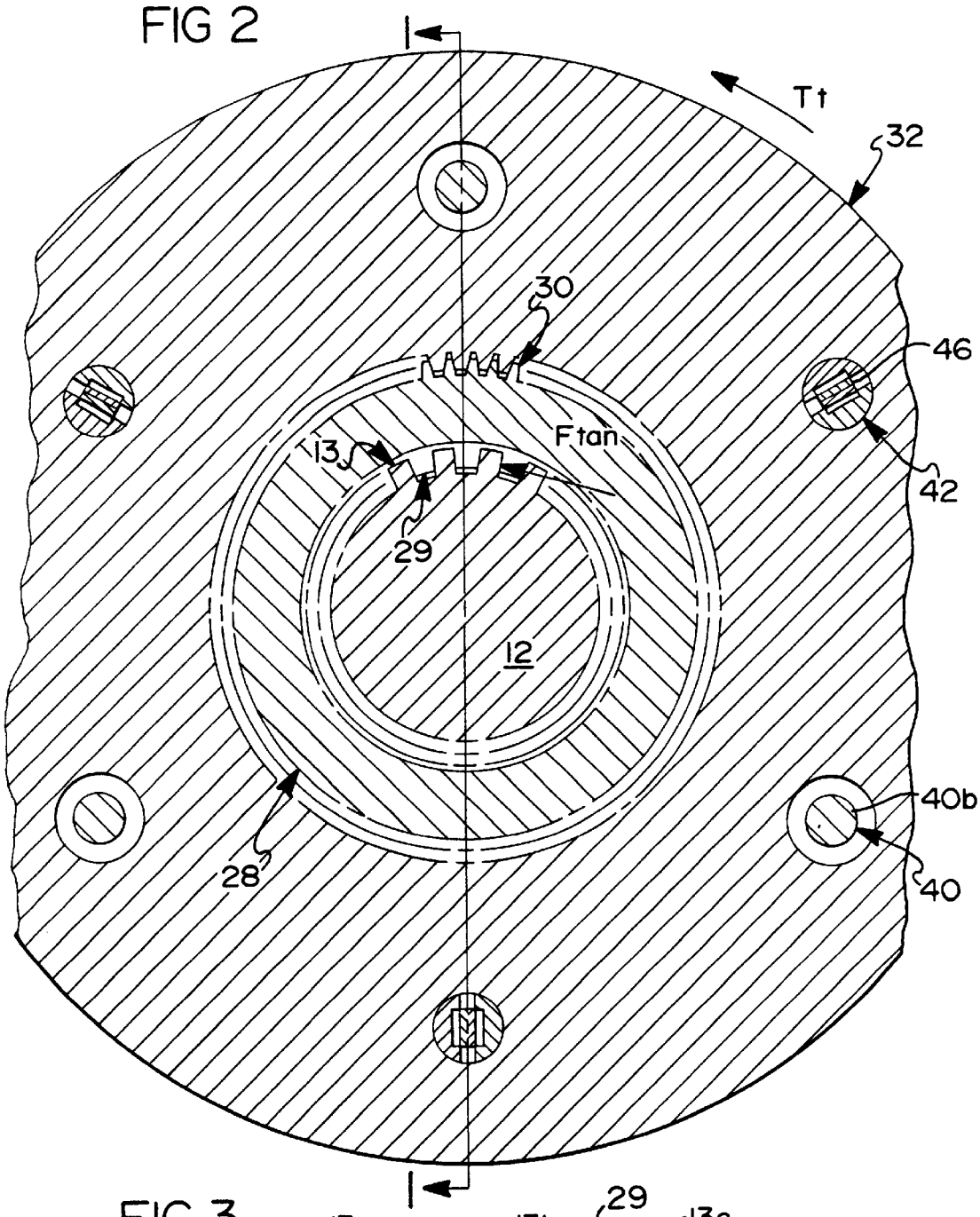
FIG. 2 is a partially sectioned view looking along line 2—2 of FIG. 1.
Figure 3:
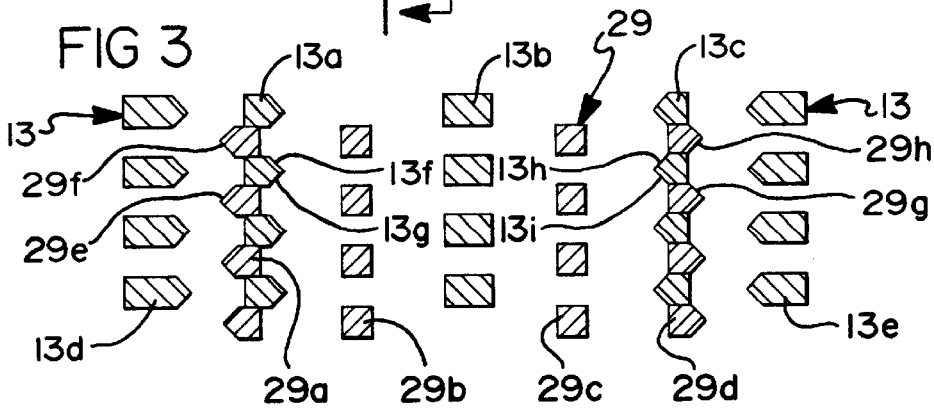
FIG. 3 partially illustrates the position of self-energizing ramps when the mechanism is in a neutral or declutched position of FIGS. 1 and 2.

Looking first mainly at FIGS. 1–3, therein is shown a gear and synchronizer assembly 10 for an otherwise unshown transmission of the type intended for use in a land vehicle, particularly of the type used in heavy duty trucks. However, assembly 10 may be used in other applications. The assembly includes a shaft 12 mounted for rotation about a central axis 12a in unshown manner, spaced apart ratio gears 14,16 rotatably supported on the shaft and secured against axial movement relative to the shaft by annular thrust members 18,20 affixed to the shaft in known manner, and a double-acting pin-type synchronizer clutch mechanism 22. When assembly 10 is part of a twin countershaft transmission, such as disclosed in U.S. Pat. Nos. 3,648,546 and 4,788,889, which patents are incorporated herein by reference, teeth 14a, 16a on the gears will be in constant mesh with engine driven gears 15,17 on countershafts, shaft 12 will be connected to or selectively connectable to a load, and shaft 12 will be free to move somewhat radially as is well known in the prior art. Herein gear 14 represents a lower speed ratio gear than does gear 16; both may be up and down shifted into.

The synchronizer mechanism 22 includes annular friction members 24,26 and jaw clutch members 14b, 16b affixed to gears 14, 16, a jaw clutch member 28 having internal spline teeth 29 with pressure flank surfaces slidably matable with flank surfaces of external spline teeth 13 integrally formed with the shaft or otherwise affixed thereto and external spline teeth 30, a radially extending shift flange 32 having internal spline teeth 32a mating with external spline teeth 30 and biased to the position of FIG. 1 by forces of spring washers 33 axially retained on jaw clutch member 28 by thrust members 34, annular friction members or rings 36,38 rigidly secured together by three circumferentially spaced apart pins 40 extending axially from each of the friction members and through openings 32b in the flange, and three circumferentially spaced apart pre-energizer assemblies 42 of the split pin-type extending axially between the friction members and through openings 32c alternately spaced between openings 32b. Opposite ends of jaw member external splines define jaw teeth 30a, 30b which respectively mate with internal jaw teeth 14c, 16c of jaw members 14b, 16b to effect positive connection of the gears to the shaft. Mating spline teeth 30,32a allow relative sliding movement between jaw member 28 and flange 32, and prevent relative rotational movement therebetween. Splines 29,13 have portions thereof removed to define self-energizing ramps as explained further hereinafter.

Alternatively, synchronizer mechanism 22 may be of the single-acting pin-type, i.e., configured to synchronize and jaw clutch only one gear to a shaft; such a mechanism is disclosed in U.S. Pat. No. 3,221,851 which is incorporated herein by reference. Pins 40 may be more or less in number than disclosed herein and other types of pre-energizer assemblies 42 may be used. Further, mechanism 22 may be other than the pin-type.

As is readily seen, friction members 24,36 and 26,38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways, e.g., by welding, or, as is known in the art, they may be formed integral with the gears. Friction members 24,26 have internal cone friction surfaces 24a, 26a which respectively mate with external cone friction surfaces 36a, 38a. Members 24,26 and 36,38 also are respectively referred to as synchronizer cups and rings.

A wide range of cone angles may be used; herein, cone angles of between twelve degrees and seven and one-half degrees are contemplated. The friction surfaces 36a, 38a and/or 24a, 26a may be defined by any of several known friction materials affixed to the base member; herein, a pyrolytic carbon friction material, such as disclosed in U.S. Pat. Nos. 4,700,823; 4,844,218; and 4,778,548 are preferred. These patents are incorporated herein by reference.

Each pin 40 includes major diameter portions 40a having diameters slightly less than the diameter of flange openings 32b, a reduced diameter or groove portion 40b spaced between friction rings 36,38 (herein midway), and conical blocker shoulders or surfaces 40c, 40d extending radially outward from the pin axis and axially away from each other at angles relative to a line normal to the pin axis. The grooved portions, when disposed within their respective flange openings, allow limited rotation of the rigid friction ring and pin assembly relative to the flange to effect engagement of the pin blocker shoulders with chamfered blocker shoulders 32d, 32e defined about the flange openings. The blocker shoulders, when engaged, prevent engagement of the jaw clutches until synchronism or substantial synchronism is reached.

Pre-energizer assemblies 42 are of the split pin-type disclosed in U.S. Pat. No. 4,252,222 which is incorporated herein by reference. Each assembly 42 includes a pair of semi-cylindrical shell halves 44 having a major diameter less than the diameter of openings 32c when squeezed together, semi-annular grooves 44a with chamfered ends 44b and a leaf spring 46 for biasing the annular grooves apart to engage the groove chamfers with flange chamfers 32f formed about opposite ends of openings 32c. The ends of the shell halves 44 abut friction rings 36,38 and are disposed within elongated recesses 36b, 38b therein.

Figure 4A:
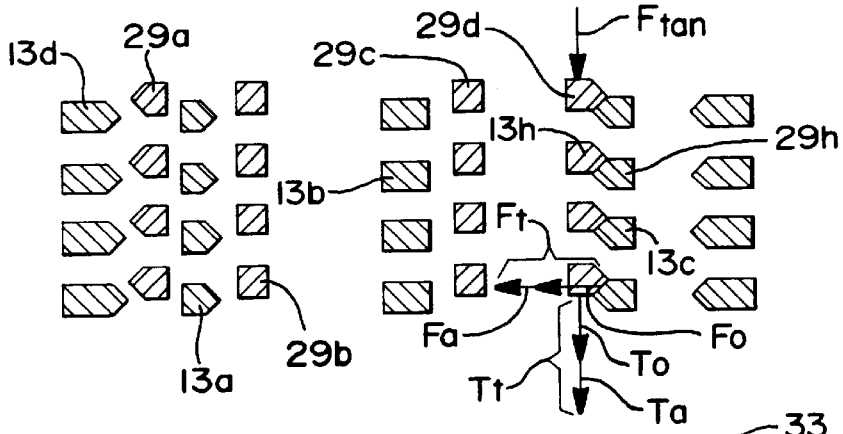
FIGS. 4A and 4B illustrate the ramps in a self-energizing position.
Figure 5A:
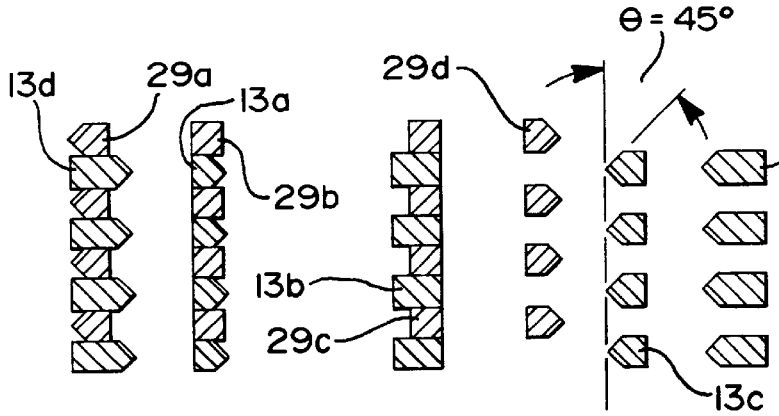
FIGS. 5A and 5B illustrate the ramps when the synchronizer mechanism is an engaged or clutch position.

Shaft splines 13, four of which are schematically illustrated in FIGS. 3, 4A, and 5A, include spline tooth portions 13a, 13b, 13c, 13d, 13e which are axially spaced apart by removal or omission of portions of spline teeth 13. Tooth portion 13a, 13c include self-energizing ramp surfaces 13f, 13g and 13h, 13i. In an analogous manner, the jaw clutch member internal splines 29 include tooth portions 29a, 29b, 29c, 29d which are axially spaced apart by removal or omission of portions of spline teeth 29. Tooth portions 29a, 29d include self-energizing ramp surfaces 29e, 29f and 29g, 29h.

When it is desired to couple either gear to the shaft, an appropriate and unshown shift mechanism connected to the other periphery of flange 32 in known manner moves the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by arrow $F_o$ in FIG. 4A.

When shift flange 32 and jaw member 28 are in the neutral position of FIGS. 1, 2, and 3, jaw member 28 is secured against rotation relative to the shaft by the close sliding mesh of spline portions 13a, 29a and 13c, 29d. When jaw teeth 30a or 30b of member 28 are in mesh with jaw teeth 14c or 16c of gears 14 or 16, three of the spline portions of the shaft and the jaw members are in close mesh with each other to provide sufficient spline surface area and structural strength for transmitting full load torque between the shaft and the gears. As may be seen in FIGS. 5A and 5B wherein jaw teeth 30a, 14c are in mesh, shaft spline portions 13d, 13a, 13b are respectively in close mesh with jaw member spline portions 29a, 29b, 29c. Further, it may be seen that the self-energizing ramps are not engaged and therefore are not subjected to wear due to full load torque transmission between the gears and shaft.

When flange 32 and jaw member 28 are initially moved axially from the neutral position toward either of the gears, jaw member spline portions 29a, 29d respectively move out of their close sliding mesh with shaft spline portions 13a, 13c to allow limited rotation of flange 32 and jaw member 28 relative to shaft 12. This initial flange movement engages the chamfered ends of pre-energizers 42 for transferring flange movement to the friction rings and effecting initial frictional engagement with one of the friction member cones. The initial frictional engagement provides an initial synchronizing torque for rotating blocker pins 40 relative to flange openings 32b to effect engagement of the flange and pin blocker shoulders, and for engaging the self-energizing ramps to provide an additive axial force $F_a$ (FIG. 4A) for increasing the total engaging force $F_t$ of the cone clutch and the synchronizing torque provided thereby. For reasons explained further hereinafter, the additive force $F_a$ may exceed desired values; accordingly, the additive force $F_a$ is transferred from jaw member 28 to flange 32 via washer springs 33 which limit the maximum value of force $F_a$.

Figure 4B:
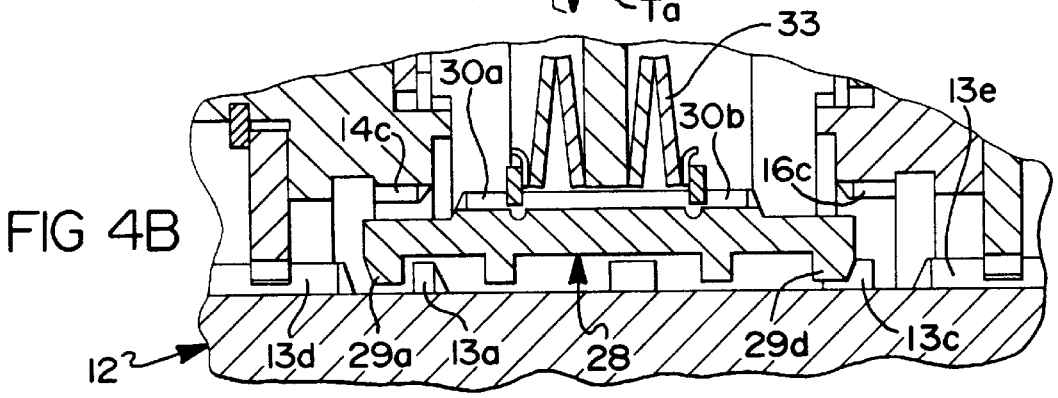
Figure 5B:
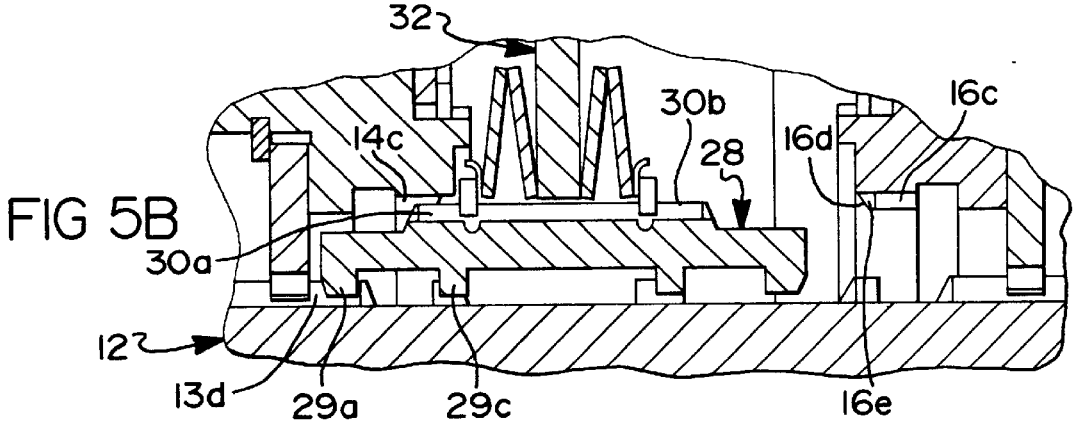

The axial spacing between the spline portions is such that relative rotation between shaft 12 and jaw member 28 is maintained while the jaw member is being moved from the neutral position of FIGS. 1 and 3 to the engaged position with one of the gears. For example, during movement of member 28 toward gear 14 as illustrated in FIGS. 4A and 4B, the direction of synchronizing torque has engaged self-energizing ramp surfaces 13h, 29h to produce the additive axial force $F_a$ in the direction of gear 14. While the ramp surfaces are engaged and thereby limiting the extend of relative rotation, the mutually facing axial ends of spline portion 13d, 29a are axially spaced apart enough to not contact and interfere with the action of the self-energizing ramp surfaces. As synchronization is reached and the blocker shoulders of flange 32 and pins 40 disengage to permit continued leftward movement of the jaw member, the leading ends of spline portions 29a enter the spaces between spline portions 13d prior to complete separation of ramp surfaces 13h, 29h, whereby the limiting relative rotational relation between the shaft and jaw member is maintained. The wedge shape of the leading ends of spline portions 13d, 29a clock the spline portions into proper alignment to allow completion of the shift as shown in FIGS. 5A and 5B. In an analogous manner, during movement of jaw member 28 toward gear 16, the self-energizing ramp surfaces of spline portions 13a, 29a engage to limit relative rotation and the leading axial ends of spline portions 29d enter the spaces between spline portions 13e as the shift is being completed.

Ramp surfaces may be provided for synchronizing one or both gears and/or for synchronizing in response to torque in either direction, as is encountered for up and down shifts. By way of example only, ramp surfaces 13h, 13i, 29g, 29h provide the additive axial force to increase synchronization of gear 14 in response to torque in either direction, and ramp surfaces 13f, 13g, 29e, 29f provide the additive axial force for gear 16 in response to torque in either direction. The angles of the ramp surfaces may be varied to provide different amounts of additive axial force for up and down shifts and for shifts into high and/or low speed ratios. Also, if no additive axial force is preferred in one direction for one gear or more, the ramp surfaces may be parallel to the shaft splines. For example purposes only, matable ramp surfaces 13h, 29h and/or 13f, 29f may be parallel to the shaft axis 12a to provide no additive axial force in response to synchronizing torque while upshifting into gears 14,16.

More specifically with respect to a shift into gear 14, initial axial leftward movement of flange 32 by the shift mechanism engages flange chamfers 32f with pre-energizer chamfers 44b to effect movement of friction ring surface 36a into engagement with friction surface 24a. The initial engagement force of friction surfaces 36a, 24a is of course a function of the force of springs 46 and the angles of the pre-energizer chamfers. The initial frictional engagement (provided an asynchronous condition exists and momentarily ignoring the effect of the self-energizing ramps) produces an initial cone clutch engaging force and synchronizing torque $T_o$ which ensures limited relative rotation between flange 32 and the engaged friction ring, and hence, movement of he reduced diameter pin portions 40b to the appropriate sides of the flange openings 32b to provide engagement of pin blocker shoulders 40c with flange blocker shoulders 32d. When the blocker shoulders are engaged, full operator shift force $F_o$ on flange 32 is transmitted to friction ring 36 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 4A. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 32b to allow continued axial movement of the flange and engagement of the external jaw teeth 30a of jaw member 28 with internal jaw teeth 14c of jaw member 14b. As is known in the prior art and as is specified by reference numbers only for jaw member 16b, the lead portions of the jaw teeth 16c in FIG. 4B have rake leading edges 16d to reduce tooth damage during initial contact, and have chamfer or wedge faces 16e to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. In an analogous manner, the lead portions of spline teeth 13d, 13e are provided with rake leading edges and chamfer or wedge faces for improved engagement with the self-energizing ramp surfaces of jaw clutch tooth portions 29a,29d, respectively.

Still ignoring the effects of the self energizing ramps, cone clutch torque provided by the force $F_o$ is expressed by equation (1).

$$T_o = F_o R_c \mu_c / \sin \alpha \quad (1)$$

where:

$R_c$=the mean radius of the cone friction surface, $\mu_c$=the coefficient of friction of the cone friction surface, and $\alpha$=the angle of the cone friction surfaces.

Looking now at the affects of the self-energizing ramps and referring particularly to FIGS. 4A and 4B, the synchronizing torque $T_o$, due to the operator applied axial shift force $F_o$, is of course transmitted to flange 32 and jaw member 28 by pins 40. The torque $T_o$ is reacted to shaft 12 across the self-energizing ramp surfaces. The self-energizing ramp surfaces limit rotation of the flange and jaw member relative to shaft 12, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. As previously mentioned, FIG. 3 illustrates the position of the self-energizing ramp surfaces while shift flange 32 is in the neutral position corresponding to the position of FIGS. 1 and 2 and FIGS. 4A and 4B illustrate a position of the ramps while gear 14 is being synchronized by engaged cone surfaces 24a,36a. In the example of FIGS. 4A and 4B, the engaged cone surfaces are producing a synchronizing torque in a direction which has effected engagement of self-energizing ramp surfaces 13h,29h. Hence, the sum of the axial forces for engaging the cone clutch is $F_o$ plus $F_a$ and the sum of the synchronizing torques being produced by the cone clutch is $T_o$ plus $T_a$. The forces and torque are graphically shown in FIG. 4A. For a given operator shift force $F_o$ and an operator synchronizing torque $T_o$, the magnitude of the axial additive force $F_a$, without the effect of washer springs 33 is a function of several variables. The main variables for calculating the additive force $F_a$ are the angles θ of the self-energizing ramps shown in FIG. 5A, angles α of the cone clutches shown in FIG. 1, coefficient of friction $\mu_c$ of the cone clutch, and means radii ratio $R_c$ of the cone clutch and $R_r$ of the self-energizing ramps.

The total synchronizing torque $T_t$ produced by the cone clutch is:

$$T_t = F_t R_c \mu_c / \sin \alpha \quad (2)$$

where $$T_t = T_o + T_a \quad (3)$$

and $$F_t = F_o + F_a \quad (4)$$

The additive force $F_a$ is preferably great enough to significantly increase synchronizing torque and decrease synchronizing time in response to moderate shift force effort $F_o$ by the operator. The force $F_a$, as mentioned above, is a function of the self-energizing ramp angles and several other variables, such as, the angles α of the cone clutch friction surfaces, the coefficient of friction $\mu_c$ of the friction surfaces, and the mean radii ratio $R_c$ of the cone clutch and $R_r$ of the self-energizing ramps. The force $F_a$ is also a function of the pressure angle of the self-energizing ramps. Herein, the pressure angle is taken as zero and therefore does not affect the value of $F_a$. In theory, fixed or constant values may be selected for the variables to provide forces $F_a$ which significantly increase synchronizing torque for moderate shift force efforts $F_o$ and to provide forces $F_a$ which increase and decrease respectively in response to the force $F_o$ increasing and decreasing. However, in practice such theoretical results are difficult to obtain, particularly when the variables are selected to provide maximum or near maximum controllable forces $F_a$, i.e., forces $F_a$ which increase and decrease in response to all operator shift force efforts $F_o$. This difficultly is due mainly to variations in the so-called fixed variables during manufacture and while in use. Accordingly, by using springs 35 to limit the maximum force of force $F_a$, the synchronizer mechanism may be configured to theoretically provide maximum or over maximum forces $F_a$ and then to reduce or limit the forces to a desired value by the use of springs 33.

A preferred embodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A self-energizing synchronizer mechanism for a first gear secured against axial movement on a shaft having an axis about which the gear and shaft rotate relative to each other, the mechanism comprising:

first friction and jaw means respectively engagable with friction and jaw means affixed to the first gear for respectively synchronizing and positive connecting the first gear to the shaft in response to a shift force ($F_o$) axially directed toward the first gear moving a shift means toward the first gear;

means connecting the first jaw means for axial movement with the shift means;

first and second blocker means operative when engaged for preventing engagement of the jaw means prior to the synchronizing;

pre-energizing means for engaging the friction means in response to initial axial movement of the shift means by the shift force ($F_o$) from a neutral position toward the first gear for engaging the blocker means in response to engagement of the friction means producing an initial synchronizing torque ($T_o$) and for transmitting the shift force ($F_o$) to the first friction means via the blocker means to increase the engaging force of the friction means;

first self-energizing means including first and second ramp means engagable in response to synchronizing torque ($T_o$) in one direction for reacting the synchronizing torque between the friction means and the shaft and for producing an axial additive force ($F_a$) for further increasing the force engaging the first friction means; characterized by:

resilient means *engaged by the axial additive force* ($F_a$) for limiting the axial additive force ($F_a$)[.];

*means for providing a force path for the shift force* ($F_o$) *to the first friction means independent of the resilient means.*

2. The synchronizing mechanism of claim 1, wherein:

the ramp means are interposed between the shaft and one of the friction means; and the resilient means is interposed between one of the ramp means and one of the friction means.

3. The synchronizer mechanism of claim 1, wherein:

the shift means includes a radially extending flange;

the first jaw means including internal spline teeth mating continuously with external spline teeth affixed to the shaft, the internal and external spline teeth having portions thereof removed for defining said first and second ramp means, said ramp means allowing limited relative rotation between the first jaw means and the shaft.

4. The synchronizer mechanism of claim 3, including means for securing the flange against rotation relative to the first jaw means and for allowing relative axial movement therebetween; and said resilient means reacts between the flange and first jaw means.

5. The synchronizer mechanism of claim 4, wherein:

said resilient means includes at least one spring washer.

6. The synchronizer mechanism of claim 1, further including a second gear axially spaced from the first gear and secured against axial movement on the shaft for rotation about the shaft axis relative to the shaft and first gear;

second friction and jaw means respectively engagable with friction and jaw means affixed to the second gear for respectively synchronizing and positive connecting the second gear to the shaft in response to a shift force ($F_o$) axially directed toward the second gear moving the shift means toward the second gear;

third and fourth blocker means operative when engaged for preventing engagement of the second jaw means prior to the synchronizing;

pre-energizer means for engaging the second friction means in response to initial axial movement of the shift means by the shift force ($F_o$) from the neutral position toward the second gear, for engaging the third and fourth blocker means in response to engagement of the second friction means producing an initial synchronizing torque ($T_o$), and the initial synchronizing torque for transmitting the shift force ($F_o$) to the second friction means via the third and fourth blocker means to increase the engaging force of the second friction means; and second self-energizing means including third and fourth ramp means engagable in response to synchronizing torque in one direction for reacting the synchronizing torque between the friction means associated with the second gear and the shaft and for producing an axial additive force ($F_a$) for further increasing the force engaging the second friction means; characterized by:

resilient means *engaged by the axial additive force* ($F_a$) for limiting the axial additive force ($F_a$) increasing the force engaging the second friction means[.];

*means for providing a force path for the shift force* ($F_o$) *to the first friction means independent of the resilient means.*

7. The synchronizer mechanism of claim 6, wherein:

the first and second ramp means are interposed between the shaft and the friction means associated with first gear, and the third and fourth ramp means are interposed between the shaft and the friction means associated with the second gear; and the resilient means is interposed between the first ramp means and one of the friction means associated with the first gear, and between the third ramp means and the friction means associated with the second gear.

8. The synchronizer mechanism of claim 6, wherein:

the shift means includes a radially extending flange; and the first and second jaw means are defined by a rigid annular jaw member having internal spline teeth mating continuously with external spline teeth affixed to the shaft, the internal and external spline teeth having portions thereof removed for defining said first, second, third and fourth ramp means, said ramp means allowing limited relative rotation between the annular jaw member and the shaft.

9. The synchronizer mechanism of claim 8, including means for securing the flange against rotation relative to the first jaw means and for allowing relative axial movement therebetween; and said resilient means for transmitting and limiting the value of the additive axial forces between the annular jaw member and the flange.

10. The synchronizer mechanism of claim 9, wherein:

said resilient means includes at least one spring washer for transmitting the additive force ($F_a$) to the friction means associated with the first gear and at least one spring washer for transmitting the additive force to the friction means associated with the second gear.

11. A pin-type synchronizer mechanism for the first and second gears mounted for rotation and secured against movement on a shaft having an axis about which the gears and the shaft rotate, the mechanism comprising:

gear friction and jaw means affixed to each gear, the friction means engagable with first and second axially spaced apart and axially movable friction means for respectively synchronizing the first and second gears with the shaft, and the jaw means engagable with axially movable first and second jaw means connected for rotation with the shaft;

shift means for axially moving the axially movable friction and jaw means into said engagement in response to an axially bi-directional shift force ($F_o$) applied to the shift means, means connecting the first and second jaw means for axial movement with the shift means;

blocker means operative when engaged for preventing engagement of the jaw means prior to the synchronizing;

pre-energizer means for engaging either one of the first and second friction means in response to initial axial movement of the shift means by the shift force ($F_o$) from a neutral position toward one of the gears for engaging the blocker means in response to engagement of the friction means producing an initial synchronizing torque ($T_o$), and for transmitting the shift force ($F_o$) to the engaged friction means via the engaged blocker means to increase the engaging force of the engaged friction means;

first self-energizing means including first and second ramp means engagable in response to synchronizing torque in one direction for reacting the synchronizing torque between the shaft and friction means associated with first gear and for producing an axial additive force ($F_a$) for further increasing the force engaging the first friction means;

second self-energizing means including third and fourth ramp means engagable in response to synchronizing torque in the one direction for reacting the synchronizing torque between the shaft and the friction means associated with the second gear and for producing an axial additive force for further increasing the force engaging the second friction means; characterized by:

resilient means for limiting the axial additive forces ($F_a$) increasing the force engaging the first and second friction means.

12. The synchronizing mechanism of claim 11, wherein:

the ramp means are interposed between the shaft and one of the friction means; and the resilient means is interposed between one of the ramp means and one of the friction means.

13. The synchronizer mechanism of claim 11, wherein:

the shift means includes a radially extending flange;

the first jaw means including internal spline teeth mating continuously with external spline teeth affixed to the shaft, the internal and external spline teeth having portions thereof removed for defining said ramp means, said ramp means allowing limited relative rotation between the first and second jaw means and the shaft.

14. The synchronizer mechanism of claim 13, including means for securing the flange against rotation relative to the first and second jaw means and for allowing relative axial movement therebetween; and said resilient means reacts between the flange and first jaw means.

15. The synchronizer mechanism of claim 14, wherein:

said resilient means includes at least two spring washers.

16. The synchronizer mechanism of claim 11, wherein:

the shift means includes a radially extending flange; and the first and second jaw means are defined by a rigid annular jaw member having internal spline teeth mating continuously with external spline teeth affixed to the shaft, the internal and external spline teeth having portions thereof removed for defining said first, second, third and fourth ramp means, said ramp means allowing limited relative rotation between the annular jaw member and the shaft.

17. The synchronizer mechanism of claim 16, including means for securing the flange against rotation relative to the first jaw means and for allowing relative axial movement therebetween; and said resilient means for transmitting and limiting the value of the additive axial forces between the annular jaw member and the flange.

18. The synchronizer mechanism of claim 17, wherein:

said resilient means includes at least one spring washer for transmitting the additive force ($F_a$) to the friction means associated with the first gear and at least one spring washer for transmitting the additive force to the friction means associated with the second gear.

*19. The synchronizer mechanism of claim 1, wherein:*

*the means for providing the force path for the shift force ($F_o$) independent of the resilient means includes the the first blocker means being rigidly affixed to the shift means.*

*20. The synchronizer mechanism of claim 1, wherein:*

*the pre-energizing means including resilient means for transmitting the shift force ($F_o$) from the shift means to the first friction means for producing an initial synchronizing torque effective to cause engagement of the blocker means via a path independent of the blocker means, the engaged blocker means then being operative to transmit the shift force ($F_o$) to the first friction means to increase the engaging force of the friction means; and*

*the self-energizing means including means for transmitting the axial additive force ($F_a$) to the first friction means via the blocker means to further increase the force engaging on the resilient means and the friction means.*

*21. The synchronizing mechanism of claim 20, wherein:*

*the pre-energizing means includes a plurality of circumferentially spaced apart pre-energizer assemblies.*

*22. The synchronizing mechanism of claim 1, wherein:*

*the ramp means are interposed between the shaft and one of the friction means.*

*23. The synchronizer mechanism of claim 1, wherein:*

*said resilient means includes at least one spring washer.*

*24. The synchronizer mechanism of claim 1, wherein:*

*the means for transmitting the axial additive force includes means affixed to the shift means for transmitting the axial additive force.*

*25. The synchronizer mechanism of claim 6, wherein:*

*the means for providing the force path for the shift force ($F_o$) independent of the resilient means includes the the third first blocker means being rigidly affixed to the shift means.*

*26. The synchronizer mechanism of claim 6, wherein:*

*the pre-energizing means including the resilient means for transmitting the shift force ($F_o$) from the shift means to the second friction means for producing an initial synchronizing torque effective to cause engagement of the third and fourth blocker means via a path independent of the third and fourth blocker means, the engaged third and fourth blocker means then being operative to transmit the shift force ($F_o$) to the second friction means to increase the engaging force of the friction means; and*

*the self-energizing means including means for transmitting the axial additive force ($F_a$) to the second friction means via the third and fourth blocker means to further increase the force engaging resilient means and the second friction means.*

*27. The synchronizing mechanism of claim 25, wherein:*

*the pre-energizing means includes a plurality of circumferentially spaced apart pre-energizer assemblies.*

*28. The synchronizer mechanism of claim 1, wherein:*

*the first and second ramp means are interposed between the shaft and the friction means associated with first gear, and the third and fourth ramp means are interposed between the shaft and the friction means associated with the second gear.*

*29. The synchronizer mechanism of claim 6, wherein:*

*said resilient means includes at least one spring washer.*

*30. The synchronizer of claim 6, wherein:*

*the means for transmitting the axial additive force includes means affixed to the shift means for transmitting the axial additive force.*

* * * * *